United States Patent [19]

Nakajima

[11] 4,052,914
[45] Oct. 11, 1977

[54] INTERNALLY ACCOMMODATED SPEED CHANGE MECHANISM APPLICABLE TO A BICYCLE, ETC.

[75] Inventor: Kazuo Nakajima, Kodaira, Japan

[73] Assignee: Xenoah Co., Hagashi Yamato, Japan

[21] Appl. No.: 566,722

[22] Filed: Apr. 10, 1975

[30] Foreign Application Priority Data

Jan. 25, 1975 Japan .................................. 50-10724

[51] Int. Cl.$^2$ ............................................ F16H 3/44
[52] U.S. Cl. ............................................ 74/750 B
[58] Field of Search ............ 192/6 A, 6 B; 74/750 B, 74/781 B

[56] References Cited

U.S. PATENT DOCUMENTS

| 3,886,811 | 6/1975 | Hillyer | 74/750 B |
| 3,908,807 | 9/1975 | Ozaki | 74/750 B |
| 3,934,493 | 1/1976 | Hillyer | 74/750 B |

FOREIGN PATENT DOCUMENTS 567,340  2/1945  United Kingdom .............. 74/750 B Primary Examiner—Samuel Scott
Assistant Examiner—Frank H. McKenzie, Jr.
Attorney, Agent, or Firm—Jones, Thomas & Askew

[57] ABSTRACT

The present invention relates to an internally accommodated three-stage speed change mechanism and an internally accommodated five-stage speed mechanism applicable to a bicycle, in which inside a hub body incorporating a portion of a speed change mechanism a first planetary gear mechanism is accommodated and a first speed changing rod is provided for controlling the first planetary gear mechanism, the ring gear of which is slidably moved by first the speed changing rod and the planetary gear of which remains axially fixed regardless of the first speed change rod.

Further, a second planetary gear mechanism is assembled additionally to the aforesaid planetary gear mechanism and a second speed changing rod controlling the revolution and torque transmitting process of a sun gear of the second planetary gear mechanism is provided.

5 Claims, 35 Drawing Figures

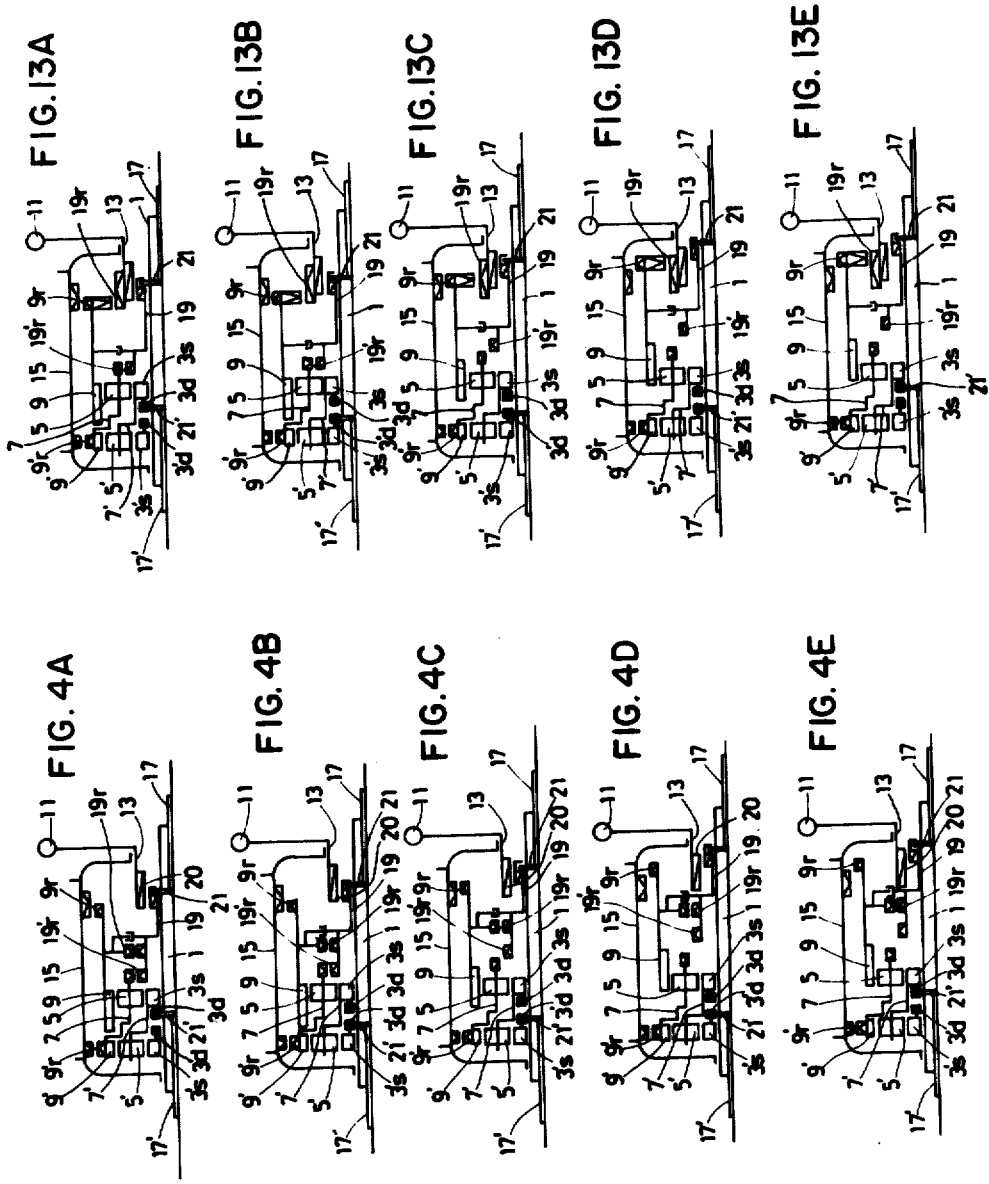

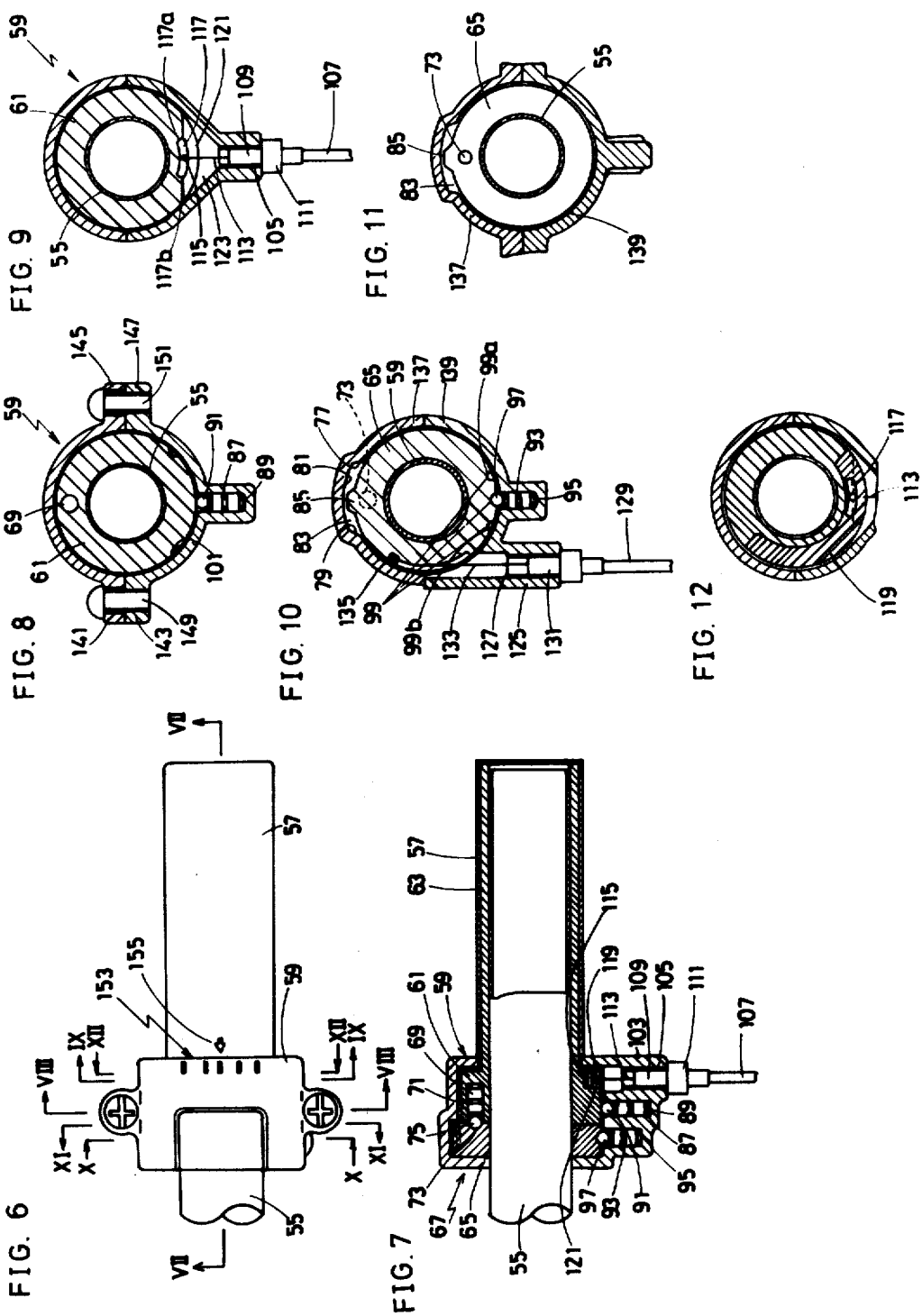

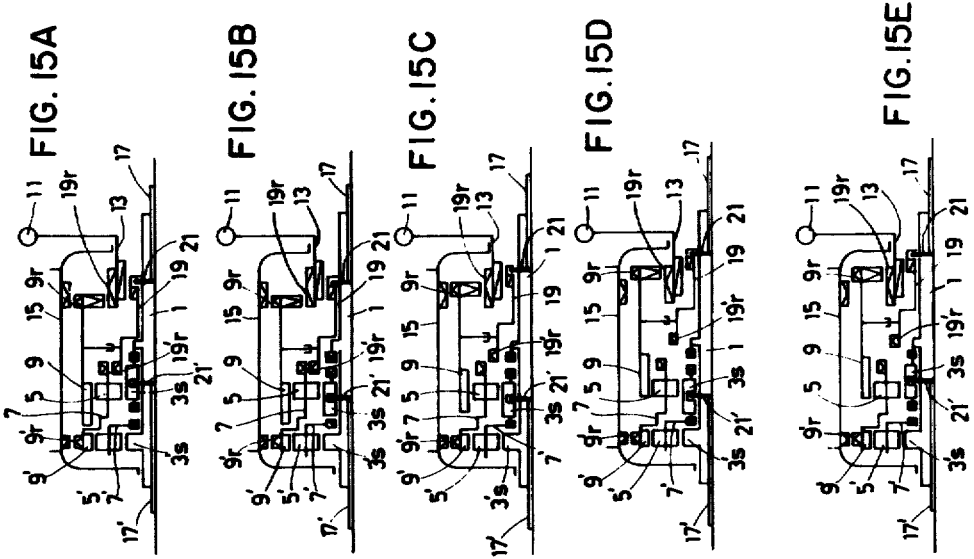
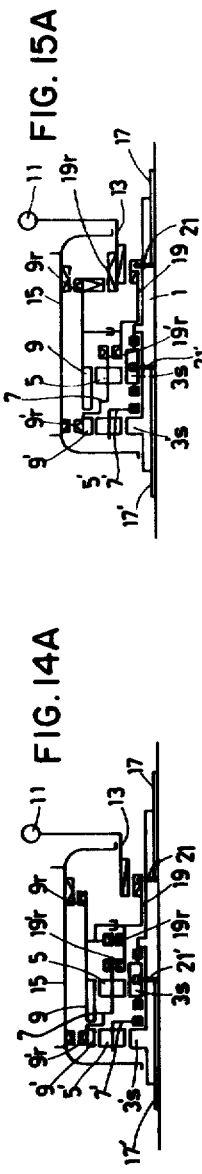
FIG. 15A FIG. 15B FIG. 15C FIG. 15D FIG. 15E
FIG. 14A FIG. 14B FIG. 14C FIG. 14D FIG. 14E

INTERNALLY ACCOMMODATED SPEED CHANGE MECHANISM APPLICABLE TO A BICYCLE, ETC.

The internally accommodated speed change mechanism of a bicycle is generally fit in the axle of rear wheel.

Diameter of hub body of this mechanism is open to the decision of the designer, however, a larger diameter and higher speed ratio invite undesirable heavier weight. The axial dimension is prescribed as approximately 120–130mm (4.73–5.12 inches) depending upon the bicycle frame and so, the designer may not go beyond this limit.

Unlike the speed changing method for a car and motorcycle allowing selection of transmitting process of torque by shifting gear in multi-dimensional two or three space, that for a bicycle is limited in such a way that speed should be changed always by shifting a gear in the axial direction inside an extremely limited space inside the hub body.

So, a large number of parts should be packed in a small space. Thus, the internally accommodated speed change mechanisms to be mounted in the bicycle rear wheel of practical use are limited only to the two-stage or three-stage.

The mechanism is safer, as it allows complete covering of the chaim with a casing, preventing contamination of the skirt and trouser hems with the oil smeared chain.

From the aforesaid reason, the mechanism was only limited to the two- or three-stage and accordingly, it was not well applicable to hilly terrain or long distance drive due to a narrow range of speed ratio selection.

SUMMARY AND OBJECTS OF THE INVENTION

The present invention is oriented to the internally accommodated speed change mechanism applicable to the bicycle rear wheel, and this mechanism can be converted to an internally accommodated five-stage speed change mechanism by adding other units to this mechanism embodying the present invention.

The present invention represents a speed change mechanism incorporating a planetary gear mechanism, the position of a sun gear to be set for speed change being varied by stage in the case of the three-stage change, i.e. the sliding motion of the first speed changing rod is always interlocked.

However, the planetary gear in mesh with this sun gear is fixed in the axial direction, no sliding motion being allowed. A five-stage speed change mechanism was developed by adding and combining another pair of planetary gear mechanism to the aforesaid planetary gear mechanism and providing the second speed changing rod which controls the revolution of the first planetary gear mechanism and process of transmission of torque.

An object of this invention is to offer a three-stage speed change mechanism featuring a small number of working parts, absence of intricate fabrication and easiness of assembly.

Another object of this invention is to offer additionally a pair of planetary mechanism added to and combined with the aforesaid mechanism to create a five-stage speed change mechanism enabling to satisfy the customers in excellent speed ratio and range of speeds.

DETAILED DESCRIPTION OF THE INVENTION

The present invention relates to an internally accommodated speed change mechanism available for installation in a hub of a bicycle. According to this invention, inside a hub body containing a portion of the speed change mechanism a set (the first) of planetary gear mechanism is installed; a speed change rod (the first) is installed for controlling the aforesaid planetary gear mechanism; a ring gear of the planetary gear mechanism; a ring gear of the planetary gear mechanism, in constant interlocking with the speed change rod, performs a constant distance displacement in axial direction of the hub axle; the planetary gear does not perform any displacement whatsoever regardless of the stage of speed change.

Further, to the aforesaid (the first) planetary gear mechanism is added an additional (the second) planetary gear mechanism for meshing and another (the second) speed change rod is provided to control the revolution and torque transmitting process of the sun gear of the aforesaid (the first) planetary gear.

The internally accommodated speed change mechanism of bicycle is generally fit in the rear wheel axle.

The diameter of hub body of this mechanism at at designer's discretion, however, a larger diameter and higher speed ratio afford undesirable heavier weight. The axial dimension is prescribed as approximately 120–130mm, depending upon the bicycle frame and accordingly, the design should keep this limit.

Further, he is not allowed, as a speed change method, to select the torque transmission process by letting a gear slide through the multi-dimensional space (secondary or ternary), as is the case with a car or motorcycle. In the case of a bicycle, there is a restriction that the speed should be changed only by sliding in the direction of hub axle within an extremely limited space available in the hub body. This situation forces packing of many components in a small space and consequently, only the two-stage or three-stage internally accommodated speed change mechanism of a practical importance is on the market. The internally accommodated speed change mechanism is safer, as the chain can completely be covered with a casing and soiling of the skirt and trouser hems with the oil smeared chain can be prevented. From these reasons, the internally accommodated speed change mechanism has only been limited to the two- or three-stage and accordingly, this particular mechanism did not lend itself to use in a hilly terrain or long distance drive due to a narrow range of speed ratio selection.

The present invention is aimed at an internally accommodated speed change mechanism applicable to the rear wheel of bicycle, and not only an internally accommodated three-stage speed change mechanism is involved, but also a five-stage mechanism becomes available by adding other mechanism to the three-stage mechanism embodying the present invention.

The present invention involves a speed change mechanism employing a planetary gear mechanism and the positions in which the sun gear is set for speed changing vary according to the different stage for the three-stage. This means that a slide of the first speed change rod is constantly meshing. However, the planetary gear meshing with this sun gear is locked always axially without sliding. This invention is so constituted that to the aforesaid planetary gear mechanism another set of planetary gear mechanism is added and combined to create a five-stage mechanism by installing the second speed change rod which controls the revolution of sun gear and torque transmission process of the first planetary gear mechanism.

An object of this invention is, when applied to the three-stage mechanism, to reduce number of components and to facilitate assembly work by dint of eliminated precision fabrications.

Another object of this invention is to create a five-stage mechanism by adding and combining another set of planetary gear mechanism enabling to satisfy requirements of customers regarding ratio and range of speed change.

Concerning the aforesaid objects and other objects and advantages of the present invention shall better be understood by the following description aided by the annexed drawings:

The theoretical description of the invention shall be given according to FIG. 1(A), (B), and (C):

FIG. 1 represents theoretical description;

FIG. 1(A) a low, FIG. 1(B) an intermediate, FIG. 1(C) a high speed condition;

FIG. 2 a descriptive cross section embodying the invention, showing the intermediate speed condition of FIG. 1(B);

FIG. 3 other embodiment than that theoretically described in FIG. 1;

FIG. 3(A), (B), (C) a low, intermediate and high speed condition respectively;

FIG. 4 is an internally accommodated five-stage speed change mechanism created by adding with mutual combination to the three-stage mechanism described theoretically in FIG. 1 another planetary gear mechanism;

FIG. 4(A) the highest, FIG. 4(B) a high, FIG. 4(C) an intermediate, FIG. 4(D) a low, FIG. 4(E) the highest speed condition;

FIG. 6 is a plan view of a control grip;

FIG. 7 through FIG. 12 a cross section along VII—VII, VIII—VIII, IX—IX, X—X, XI—XI and XII—XII line of FIG. 6 respectively.

FIG. 13 through FIG. 15 another embodiment of FIG. 4;

FIG. 13(A), (B), (C), (D) and (E) theoretically the highest, a low, an intermediate, a low, the lowest speed condition respectively;

FIG. 14(A), (B), (C), (D) and (E) as well as FIG. 15(A), (B), (C), (D) and (E) theoretically the highest, a high, an intermediate, a low and the lowest speed condition respectively.

Figure 1A:
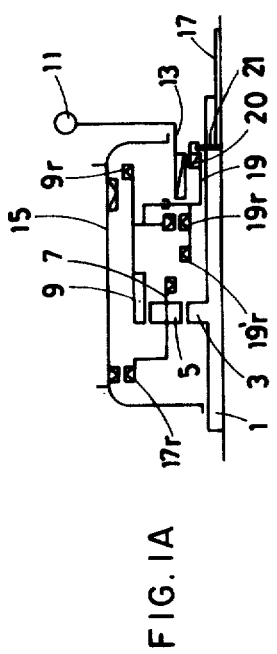

Further, a symbol  represents a ratchet,  a spline, key, etc. FIG. 1(A), (B) and (C) theoretically a low, an intermediate and a high speed condition. As closely shown in the drawing, in the embodiment of the invention, the first speed change rod 17, sleeve 19 and the first ring gear 9 displace axially integrally and only the ring gear 9 is connected free to rotate and position of this integral unit on the righthand, center and lefthand side determines a low, an intermediate and a high speed respectively. Namely, in a low speed in FIG. 1(A), the driving force is transmitted: input component member 13 → sleeve 19 → first ring gear 9 → first planetary gear 5 → first carrier 7 → hub body 15 and for an intermediate speed in FIG. 1(B), input component member 13 → sleeve 19 → first ring gear 9 → hub body 15 and for a high speed in FIG. 1(C): input component member 13 → sleeve 19 → first carrier 7 → first planetary gear 5 → first ring gear 9 → hub body 15. While, the speed ratio with a number of teeth of the first sun gear of 15, of the first plane-gear of 15, of the first planetary gear of 3, of the first ring gear of 48, 0.76–1.0–1.31 is obtained.

Figure 1B:
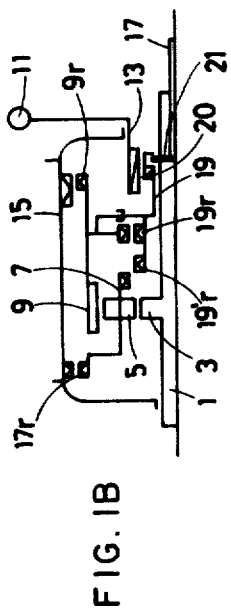
Figure 2:
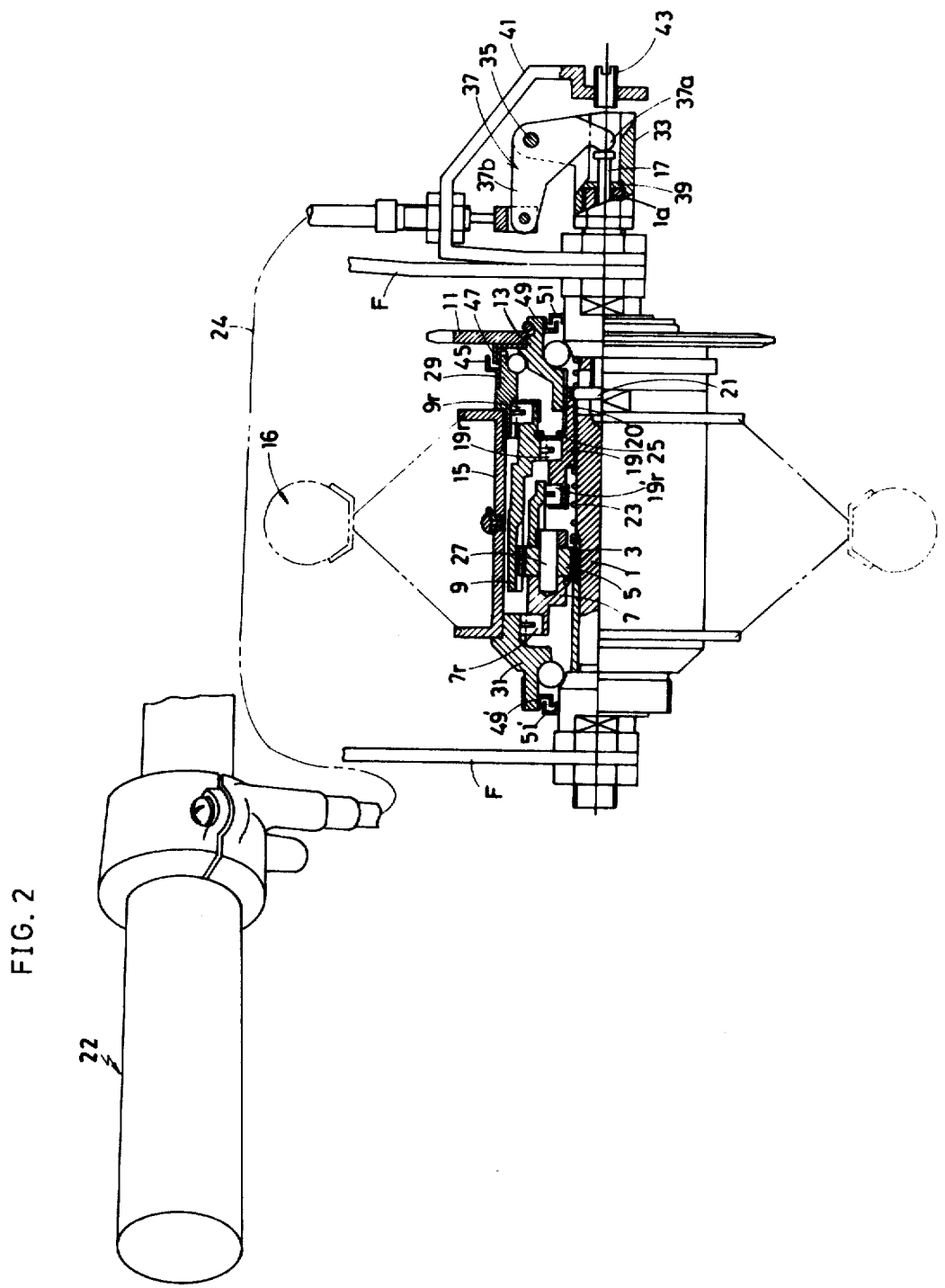

Next, specific description shall be given on a practical example embodying the present invention referring to FIG. 2 and other drawings. FIG. 2 represents a partially sectioned front view showing the intermediate condition as FIG. 1(B). 1 represents the hub axle, 3 the first sun gear installed integrally in 1, 5 the first planetary gear meshing with 3, 7 the first carrier supporting free to rotate 5, 9 the first ring gear meshing with 5, 11 the driving sprocket, 13 the input component member fixed integrally with 11, 15 the hub body rotating integrally with the rear wheel 16, 17 the first speed change rod and 19 the sleeve. 19 can slide axially by constant engagement of the member 13 and spline 20. Speed change is conducted as follows: upon axial displacement of the first speed change rod 17 with the control wire 24, connected with the grip 22, the sleeve 19 makes axial displacement between the member 13 and the hub axle 1 by the first speed change pin 21 installed on the inner end of the rod 17. Namely, the spring 23 is provided between the sleeve 19 and the first sun gear 3 as well as the first planetary gear 5 and the sleeve 19 follows the displacement of the rod 17 i.e. the first speed change pin 21. The sleeve 19 on its end is in engagement with the first ring gear 9 by the ratchet 19r and its displacement is stopped by the snap ring 25 and they displace axially in bloc. The sun gear 3 is made integral with the hub axle 1 and they can neither rotate nor slide. The first carrier of supporting free to rotate with the pin 27 a plurality of the first planetary gears 5 constantly meshing with the first sun gear 3 and the first ring gear 9, rotates but not slides relatively to the hub axle 1. On the first ring gear 9 is provided the ratchet 9r which transmits its driving force to the hub body 15. The ratchet 19r of the sleeve 19 is in constant engagement with the first ring gear 9 and transmits the driving force of input member 13 to the first ring gear 9 with the same rpm and direction, however, lower revolution of 13 than the ring gear 9, stop and reversing are conducted by the sliding ratchet 19r.

Figure 1C:
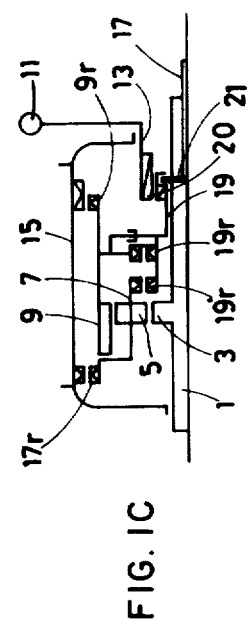

The ratchet 9r is engaged with the hub body 15, or with inner groove of the righthand bowl 29 screwed in 15 only in the status of the intermediate speed, FIG. 2 and FIG. 1(B) and the high speed, FIG. 1(C), transmitting the driving force of the first ring gear 9 to 15 through the righthand bowl 29 in the same rpm and direction. Retardation of speed of the first ring gear 9 regarding the hub body 15 causes sliding of the ratchet 9r, effecting relative revolution in the same way as the ratchet 19r. 31 represents the lefthand bowl screwed in or pressed in the hub body 15. The input component member 13 and lefthand bowl 31 are supported free to rotate of the hub axle 1 respectively through balls. The driving sprocket 11 is integrally fixed with the member 13.

Thus, in the intermediate speed, FIG. 1(b), the first speed change rod 17, sleeve 19 and the first ring gear 9 are located in the middle and the driving force of sprocket 11 is transmitted to the first ring gear 9 through the member 13. Sleeve 19 and ratchet 19r and to the hub body 15 through the ratchet 9r and righthand bowl 29. 7r represents the ratchet constantly in mesh with the inside groove of the lefthand bowl 31. However, for the intermediate speed, as the rpm of hub body 15 driven in the same rpm and direction with the member 13 is higher than the rpm of the first carrier 7 embracing the first planetary gear 5, the ratchet 7r slides without transmission of force.

Upon bringing the intermediate speed condition, FIG. 1(B) to the condition of FIG. 1(A) where the first speed change rod 17 i.e. the first pin 21 is drawn to the right direction, the sleeve 1 and the first ring gear 9 pushed out by the spring 23 make a rightward displacement accordingly. Engagement of the ratchet 19r stays, however, the ratchet 9r is driven into the grooveless portion of righthand bowl 29 and brought out of engagement. Accordingly, the driving force of the member 13 is transmitted to the first ring gear 9 through the sleeve 19 and ratchet 19r and from the gear 9 to the first carrier 7 through the first planetary gear 5 and further, to the hub body 15 through the ratchet 7r and lefthand bowl 31. Here, against the intermediate speed with the hub body 15, a lower speed is obtained by the insertion of the first planetary gear 5. 19r represents the ratchet available to be connected or disconnected with or from the inside groove of the first carrier, however, is set free in the intermediate condition, FIG. 1(B) and the low speed, FIG. 1(A).

When the condition of FIG. 1(C) is reached, by pushing leftward of the first speed change rod 17, i.e. the first pin 21 from the intermediate speed, the sleeve 19 and the first ring gear 9 make the leftward displacement against the spring 23. Now, connection of the input component member 13 and sleeve 19 and with the spline 20 and engagement of the ratchet 19'r and inside groove of the first carrier 7 cause the member 13, sleeve 19 and carrier 7 to rotate in the same direction and with the same rpm, however, the first ring 9 rotates with a higher speed in the same direction by the intervention of the first planetary gear 5. The driving force of input component member 13 is transmitted at higher speed to the hub body 15 through the sleeve 19, the first carrier 7, the first planetary gear 5, the first ring gear 9, ratchet 9r and righthand bowl 29. Here, the ratchet 7r, as the lefthand bowl 31 in engagement with this rotates at higher speed, generates slipping without transmission of force. In place of the aforesaid ratchet 19'r, a dog clutch opposing the first carrier 7 and sleeve 19 may be used.

Further, F in FIG. 2 represents a bicycle frame, supporting the both ends of the hub axle 1. 33 represents the first boss mounted on one end of the hub axle 1 and on the rear end of the aforesaid first speed change rod 17 incorporating the aforesaid speed change 21 on the extreme end, the rod 17 being inserted free to slide in the hole 1a of the aforesaid hub axle 1 and in its proper location, the first link 37 is anchored with a fulcrum pin 35. The end 37a of the link 37 contacting with the rear portion of the aforesaid first speed change rod 17. Additionally, on the other end 37b of the first link 37 is connected on end of the controlling wire 24 extended from the control grip 22. The aforesaid first link 37, upon speed changing operation with the control grip 22, by fraction of the other end 37b by the wire 24 its end 37a causes an axial displacement of the first speed change rod 17, making the sleeve 19 to slide and operating the planetary gear mechanism. 39 represents a dust seal mounted on the end of hub axle 1 surrounding the first speed change rod 17 and it closes the clearance between the rod 17 and the hole 1a of axle 1, preventing difficulty of displacement of the rod 17, caused by infiltration of dirt, mud and water into this clearance. 41 represents the first speed change guard covering an end of the axle 1, boss 33, link 37 and it is mounted on the frame F or one end of the axle 1 and in its proper position, an end of the cable of control wire 24 is supported. Further, in a position opposing the 37a of the first link 37 is connected with a thread the set screw 43 adjusting the position of the rod 17. The first speed change guard 41 prevents direct exposure of the first link 37, to rain water and also, damages inflicted on the first link 37, caused by the bumps on the road. It is effective to reduce hazardous effects when a pedestrian is struck by the first link, the aforesaid set screw 43, upon failure of controlling function of the first speed change rod 17 caused by, for instance, snapping of the wire 24 and converting to a lower speed of the speed change mechanism by the action of spring 23 acting on the sleeve 19, pushes the first speed change rod 17 to obtain the intermediate speed, by rotation of the set screw 43 and pressure on 37a of the first link 37.

45 represents water slinger ring distributed over the periphery in the neighborhood of the end of the hub body 15 at its sprocket 11 side, its end being overlapped with the cap 47 installed on the sprocket 11. The water slinger ring 45, cap 47 prevent infiltration of mud, dirt, water into the internally accommodated speed change mechanism through the gap between the hub body 15 and sprocket 11. 49, 49' and 51, 51' represent U-shaped sectioned seals distributed over inside surface on the outer end of the member 13 and lefthand bowl 31 and outer periphery of hub axle 1, the seals 49, 51 and 49', 51' being overlapped respectively.

Figure 3A:
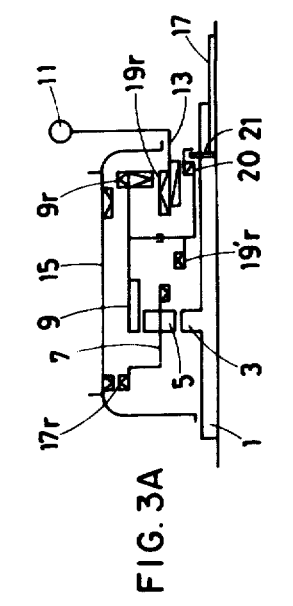
Figure 3B:
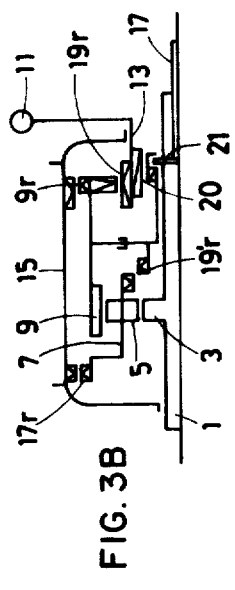
Figure 3C:
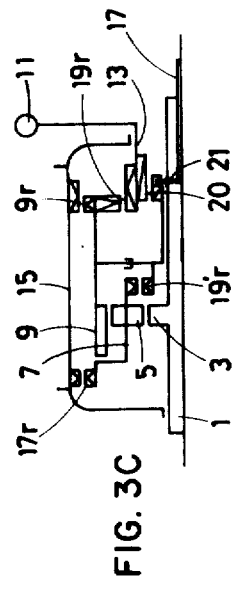

FIG. 3 represents a principle view of the second embodiment of the invention of the internally accommodated speed change mechanism described on its principle in FIG. 1, FIG. 3(A), (B) and (C) representing principle of the low, intermediate and high speed respectively. FIG. 1 differs from FIG. 3 only regarding the position of ratchet 19r as described in FIG. 1. Namely, in the construction represented in FIG. 1, as described in detail with FIG. 2, while the ratchet 19r is inserted between the sleeve 19 and the first ring gear 9, in FIG. 3 19r is located between the input member 13 and the first ring gear 9 and as the rest of construction is exactly the same, the same symbol is given to the part of the same function.

FIG. 4 represents an internally accommodated five-stage speed change mechanism constructed by combining the speed change mechanism shown in principle in FIG. 1 with another planetary gear mechanism. In the attached drawings, the same symbol shall be given to the parts having the same function with that described in FIG. 1 and FIG. 2.

FIG. 4(A), (B), (C), (D) and (E) represent drawings showing principle and (A) represents the highest, (B) high, (C) intermediate, (D) low and (E) the lowest speed. 1 represents the hub axle, 3 the first gear (number of teeth being $2s_1$) corresponding to the aforesaid first sun gear 3 and in this embodiment, it is fit in the specified position free to rotate relative to the hub axle 1. 3's represents, in the same way as the first sun gear 3s, the second sun gear (number of teeth being $2s_2$) fit in the specified position free to rotate in the hub axle 1. 5 represents the first planetary gear meshing with the first sun gear 3s, 5' the second planetary gear meshing with the second sun gear 3's, 7 the first carrier supporting the first planetary gear 3s free to rotate, 7' the second carrier supporting the second planetary gear 5' free to rotate and being integral with the first sun gear 3s, 9 the first ring gear (number of teeth being $2r_1$) meshing with the first planetary gear 5, 9' the second ring gear (number of teeth being $2r_2$) meshing with the second planetary gear 5' and being integral with the first carrier 7, 11 the driving sprocket, 13 the input component member rotating with the driving sprocket 11, 15 the hub body, 17 the first speed change rod, 17' the second speed change rod and 19 the sleeve in engagement with the member 13 with the spline groove 20 and available for axial displacement by the first speed change rod 17.

The aforesaid second speed change rod 17' allowing the connecting piece, such as the second speed change pin 21' to slide axially in the hub axle 1 at its extreme end, switches positions to fix the first sun gear 3s or the second sun gear 3s' in a proper position. Further, ▨ indicates a ratchet, ▨ a dog clutch, a spline, key.

For the highest speed in FIG. 4(A), the driving force from the sprocket 11 is transmitted to the member 13—sleeve 13—the carrier 7—the first ring gear 9—hub body 15 and the speed ratio assuming $2s_1 = 24$, $2r_1 = 54$, becomes:

$$H = \frac{2s_1 + 2r_1}{2r_1} = \frac{24 + 54}{54} = 1.444$$

For the high speed in FIG. 4(B), the driving force from 11 is transmitted to the member 13–sleeve 19–the first carrier 7–the second ring gear 9'–the second planetary gear 5'–the second carrier 7'–the first sun gear 3s–the first planetary gear 5–the first ring gear 9–hub body 15 and the speed ratio, assuming $2s_2 = 24$, $2r_2 = 54$, becomes:

$$H' = \frac{2s_1 \times 2s_2 + 2r_1 \times (2s_2 + 2r_2)}{2r_1 \times (2s_2 + 2r_2)}$$

$$= \frac{24 \times 24 + 54 \times (24 + 54)}{54 \times (24 + 54)} = 1.137$$

For the intermediate speed in FIG. 4(C), the driving force from 11 is transmitted to the member 13–sleeve 19–the first ring gear 9–hub body 15 and the speed ratio is $N = 1.000$.

In this condition, there is no preference of position of the second speed change pin 21' installed on the second speed change rod 17'. For the low speed in FIG. 4(D), the driving force 11 is transmitted to the member 13—sleeve 19–the first ring gear 9–the first planetary gear 5'–the first carrier 7–the second ring gear 9'–the second planetary gear 5'–the second carrier 7'–the second ring gear 9'–hub body 15 and the speed ratio becomes:

$$L = \frac{12r_1 \times (2s_2 + 2r_2)}{2s_1 \times 2s_2 + 2r_1 \times (2s_2 + 2r_2)}$$

$$= \frac{54 \times (24 + 54)}{24 \times 24 + 54 \times (24 + 54)} = 0.880$$

For the lowest speed in FIG. 4(E), the driving force from 11 is transmitted to the member 13–sleeve 19–the first ring gear 9–the first planetary gear 5–the first carrier 7–the second ring gear 9'–hub body 15 and the speed ratio is:

$$L = \frac{2r_1}{2s_1 + 2r_1} = \frac{54}{24 + 54} = 0.692$$

The following shall be a specific description about the speed change mechanism represented in FIG. 4.

Figure 5:
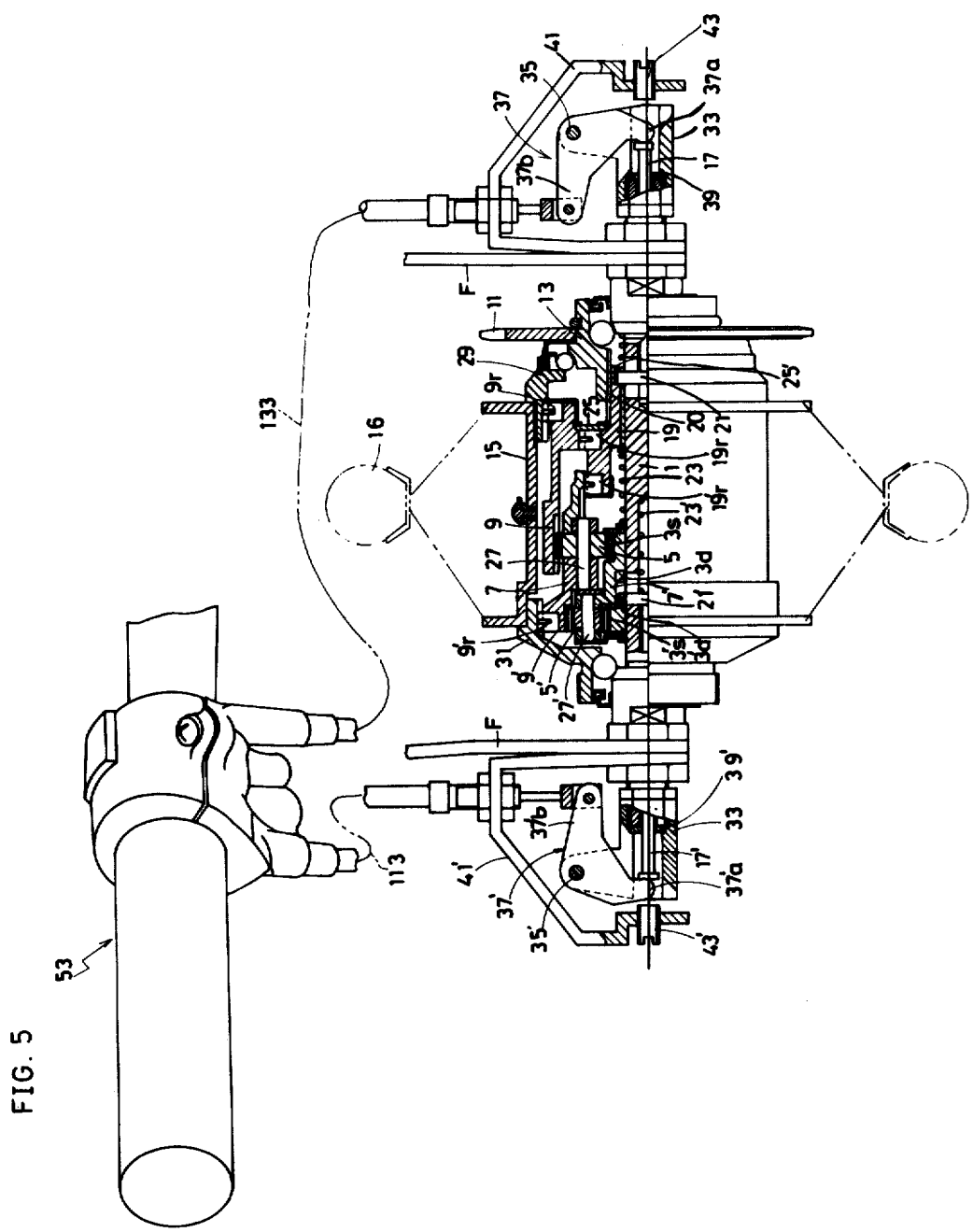
FIG. 5 is a descriptive partial cross section of the embodiment in the intermediate speed condition as FIG. 4(C)

FIG. 5 represents a partially sectioned construction drawing, showing the intermediate speed condition corresponding to the principle drawing of FIG. 4(C).

In FIG. 5, 1 represents the hub axle the both ends of which being fixed in the frame F, 3s and 3's the first and second sun gear incorporated free to rotate in an axially fixed position in the hub axle 1, 5 the first planetary gear meshing with the gear 3s, 5' the second planetary gear meshing with the gear 3's, 7 the first carrier supporting the gear 5 free to rotate, 7' the second carrier supporting the gear 5' free to rotate and being integral with the first sun gear 3s, 9 the first ring gear meshing with the gear 5, 9' the second ring gear meshing with the gear 5' and being integral with the first carrier 7, 11 the driving sprocket, 13 the input component member available to rotate with the driving sprocket 11, 15 the hub body available to rotate with the rear wheel 16, 17 and 17' the first and second speed change rod respectively, 19 the sleeve conducting the axial displacement through the first speed change pin 21 which is connected with the spline 20 of the member 13 and fixed to the extreme end of the first speed change rod 17. The second speed change rod 17' allows the second speed change pin 21' incorporated free to slide axially in the hub axle 1 to slide against the force of spring 23' and brings the aforesaid second speed change pin 21' on its end in engagement with the dog clutch 3d or 3'd of the first sun gear 3s or the second sun gear 3's selectively and changes over the locking of the first and second sun gear 3s and 3's with the hub axle 1. The first sun gear 3s is engaged with the hub axle 1 free to rotate and the spring 23 intervenes between the sleeve 19. As the lefthand end of the second carrier 7' integral with the first sun gear 3s is contacted with the second sun gear 3's, the first sun gear 3s is free to rotate relative to the hub axle 1, however its axial displacement is impossible. The second sun gear 3's is installed in the hub axle 1 free to rotate, however, as it is inserted between the inside step of the second carrier 7' subjected to the pressure of the aforesaid spring 23 and the step of the hub axle 1., its axial displacement is impossible. The first sun gear 3s and the second sun gear 3's are fixed to the hub axle 1 respectively, as the second speed change pin 21' fixed to the end of the second speed change rod 17' is engaged with the dog clutches 3d, 3'd installed opposing the sun gears respectively.

On the hub axle 1, the first speed change pin 21 installed at the end of the first speed change rod 17 free to slide axially and the sleeve 19 sliding with it axially through the washer and the snap ring 25'. Driven by the first speed change pin 21 is installed free to rotate in the hub axle 1. The first ring gear 9 is engaged with the ratchet 19r installed in the sleeve 19 and the first ring gear 9 and sleeve 19 are constructed so as to rotate integrally only in one direction, however, their axial displacement is restricted by each other by the washer and snap ring 25.

Consequently, the first speed change rod 17, sleeve 19 and the first ring gear 9 are free to slide axially as an integrated body. 19'r represents a ratchet located on the lefthand end of the sleeve 19.

The first planetary gear 5 is supported on the first carrier 7 free to rotate by the pin 27 and on the righthand end of the first carrier 7 is installed detachably with the aforesaid ratchet 19'r the opposing ratchet driven body (inside peripheral groove.)

On the outside periphery of the first ring gear 9 is installed the ratchet 9r and it is connected detachably with the ratchet driven body (inside peripheral groove) installed on the inside periphery of the righthand bowl 29 screwed into the hub body 15.

31 represents the lefthand bowl screwed into the hub body 15 and inside of which is installed the ratchet driven body (inside peripheral groove) engaging with the ratchet installed on the outside periphery of the second ring gear 9'.

The following shall be descriptions how the speed conditions FIG. 4(A), (B), (C), (D) and (E) in FIG. 5 can be obtained respectively. FIG. 5 represents the same condition as FIG. 4(C). The first speed change rod 17 is located in the middle and the second rod 17' on the outside. The sleeve 19 opposing the pressure of spring 23 occupies the middle position and the ratchet 19'r is out of engagement with the first carrier 7. At this moment, the ratchet 19r is in engagement with the first ring gear 9. As the second speed change pin 21' is in engagement with the dog clutch 3'd, the second sun gear 3's is fixed and the first sun gear 3s is free. Consequently, as shown in FIG. 4(C), the driving force is transmitted to cause the intermediate speed. The second sun gear 3's should not necessarily be held in fixed condition.

When the first speed change rod 17 is pressed from the position in FIG. 5 to the inside position and the second rod 17' is left unchanged in the outside position, the condition of FIG. 4(B), high speed, is obtained. By the first speed change rod 17 displacing to the left opposing the spring 23, the sleeve 19 and the first ring gear 9 are made to displace integrally to the left, bringing the ratchet 19'r and the first carrier 7 in engagement. The second sun gear 3's is fixed with the second speed change rod 17'.

Consequently, as shown in FIG. 4(B), the driving force can be transmitted with a high speed. In this condition, the ratchet 9'r slides relative to the lefthand bowl 31 and the ratchet 19r relative to the first ring gear 9.

In FIG. 4(A), the first speed change rod 17' is held similarly inside position and the second rod 17' is driven inside to be kept inside and thus the highest speed is available. Namely, the ratchet 19'r is in engagement with the first carrier 7 and the sun gear 3s becomes fixed in accompaniment of rightward displacement of the second speed change rod 17', setting the second sun gear 3's free. Consequently, the driving force is transmitted to afford the highest speed, as represented in FIG. 4(A). In this situation, the ratchet 9'r slides relative to the first ring gear 1.

The FIG. 4(D) represents the outside position of the pulled out first speed change rod 17 and maintained outside position of the second speed change rod 17', corresponding, corresponding to the low speed. Namely, with the displacement of the first speed change rod 17, the sleeve 19 and the first ring gear 9 makes an integral rightward displacement and accompanying this motion, the ratchet 9r is disengaged from the righthand bowl 29. Further, the ratchet 19' is disengaged from the first carrier 7. As the second speed change rod 17' is located outside as shown in FIG. 4(C), the second sun gear 3's becomes fixed and the first sun gear 3s released. Consequently, as shown in FIG. 4(D), the driving force is transmitted to produce the low speed.

In FIG. 4(E), the first speed change rod 17 located outside as FIG. 4(D) and the second speed change rod 17' is kept inside as FIG. 4(A), producing the lowest speed. Namely, like FIG. 4(D), the ratchet 9r is disengaged from the righthand bowl 29 and the ratchet 19'r from the first carrier 7. As the second speed change rod 17' is located inside, the first sun gear 3s becomes fixed and the second gear 3's is released. Consequently, as shown in FIG. 4(E), the driving force is transmitted to produce the lowest speed.

The following is a summarizing table of the speeds and relative positions of the first and second speed change rod 17 and 17':

|  | Second speed change rod | First speed change rod |
| --- | --- | --- |
| Highest speed | Inside | Inside |
| High speed | Outside | Inside |
| Intermediate speed | Outside (or inside) | Intermediate position |
| Low speed | Outside | Outside |
| Lowest speed | Inside | Outside |

As described in the above, in the mechanism, of this kind, the aforesaid first speed change rod requires an intermediate position and lefthand and righthand operating positions and the second rod requires the leftward and rightward operations, but not necessarily the intermediate position. Accordingly, the operating space of the second speed change rod may be smaller than the first rod.

Further, in FIG. 5 as the link mechanism operating the axial travel of the first speed change rod 17 is identical with that shown in FIG. 2, the same symbol is allocated and no detailed description shall be given.

Further, as the link mechanism operating the second speed change rod is constructed symmetrically with that for the first rod, to the component member conducting the same function is identified only 53 represents a control grip conducting the speed change operation of the aforesaid internally accommodated speed change mechanism by operating the aforesaid link mechanism driving the aforesaid link mechanism and the second speed change rod 17' the axial displacement actuating the axial displacement of the aforesaid first speed change rod 17.

The grip 53 controls with a controlling mechanism located on a handle shaft incorporating a plurality of speed change rods. The following shall be the detailed description of the grip 53 with the drawings, FIG. 6 through FIG. 12.

In drawings FIG. 6 through FIG. 12, 55 represents the handle, 57 grip and 59 cover. 61 represents the control wire connecting member located free to rotate on the handle, provided with a circular external shape and a rod part 63 with a thin wall extending to only one side.

65 representing the second connecting member for control wire constitutes with the second member 61 a blind hole admitting a spring 71 installed on the end surface of the control member 61, 73 a spherical recess installed on the end surface of the member 65. It is thus understood that the first control wire connecting member 61 is contacting the second member 65 through the spring 71 and ball 75.

The aforesaid 59 covers free to slide a greater part of the periphery of the first control wire connecting member 61 excluding the rod. This is illustrated most clearly in FIG. 8 and FIG. 9. Further, the cover 59 covers free to slide a greater part of the periphery of the second control wire connecting member 65 and its portion is provided with an arc-shaped recess 83 consisting of the side walls 77 and 79 and bottom surface 81 and a projection 85 on the member 65 is available to travel between the wall 77 and 79. This situation is most clearly shown in FIG. 10 and FIG. 11. On the inside peripherial surface of the cover 59 and in a part corresponding to the member 61, a blind hole 89 is provided for admitting the spring 87 and the ball 91 is pressed on the peripheral surface of the first connecting member 61.

Similarly, in a portion corresponding to the second connecting member 65, a blind hole 95 is provided for admitting the spring 93 for pressing the ball 97 and especially, on the peripheral surface of the second connecting member 65 are provided a number of small spherical recesses 99 with the equal distances, the ball 97 being pressed by the spring 93 in the recess 99. A plurality of spherical recess 101 (FIG. 8) may be installed.

From the above, it can be understood that, upon turning the grip 57 in any direction, the first control connecting member 61 in the same direction and in the same range of rotation as the range of the above rotation. With this rotation, the second control wire connecting member 65 also through the spring 71 and ball 75 rotates in the same direction with the first control wire connecting member 61 letting the ball 97 enter into and come out of the aforesaid plurality of recesses 99.

Further, the projection 85 is blocked by either the wall 77 or 79 stopping the further rotational motion and the ball 75, forced by the end surface of the second control member 65, is introduced into the blind hole 69 against the force of the spring 71 and rubs over the end surface of the second control member 65 and thus, the first control wire connecting member 61 rotates further by the rotating amount of the grip 57. In the meantime, the second control member 65 keeps its exact position under the elastic pressure of the ball 97 introduced in the recess 99.

The cover 59 is incorporated with a protruding flange 103 and a leg 109 of the wire guiding member 107 is screwed in the threaded hole 105 installed inside the flange. 111 represents a stop nut. 113 represents the first control wire connected with the link 37′ actuating the aforesaid second speed change rod 17′ on its one side and on the other end a connecting piece 115 is installed. On a portion corresponding to the aforesaid flange 103 of the first control member 61 is provided an arc-shaped clearance 117 for containing free to rotate the aforesaid connecting piece 115. In this embodiment the clearance 121 admitting the first control wire 113 is formed by cutting a side surface and covering with a semicircular washer 119. 123 represents a clearance formed between the inside space of the flange 103 and the first control wire connecting member 61.

On a portion of the cover 59 corresponding to the second control wire connecting member 65 is provided a flange 125 and the flange 125 is provided with a threaded hole 127 and in it the leg 131 of the wire guiding member 129 is fixed with the thread. 133 represents the second control wire, one end of which is being connected with the link 37 actuating the aforesaid first speed change rod 17 and the other end with a proper position on the outside periphery of the second control wire connecting member 65 by the connecting piece 135. Further, the cover 59 consists of the upper cover 137 and lower cover 139 and joints the oppposedly installed flanges 141, 143 and 145, 147 and assembled detachably with the fixing pieces 149 and 151. 153 represents a plurality of graduation lines stamped on the grip side of the cover 59, 155 an arrow stamped on the grip 57 facing the aforesaid lines 153. The lines 153 and the arrow 155 are provided for facilitating operations described later.

The following shall be description of functions divided from the above construction. For better understanding, in FIG. 8 through FIG. 11, the first control wire connecting member 61 is assumed to be located outside, the second member 65 in the middle, namely in the intermediate position.

Upon rotating the grip 57 and rotating the first control member 61 in the clockwise direction to bring the connecting piece 115 in contact with the side wall 117a of the arc-shaped clearance 117 as shown in FIG. 8 and FIG. 9, the piece 115 is allowed to slide in the clearance 117 causing the aforesaid link 37′ idle by absence of traction of the first control wire 113 and the second speed change rod 17′ remains outside all the same.

With the rotation of the aforesaid first control wire connecting member 61, by way of the spring 71, ball 75, the second control member 65 rotates integrally in the clockwise direction and as the second control wire 133 is pulled when the projection 85 contacts with the side wall 77 of the recess 83. The aforesaid link 37 is brought in rotation to cause the displacement of the first speed change rod 17 to the inside position. Namely, the high speed is obtained with the first rod 17 in the inside position and the second rod 17′ in the outside position. On this occasion, the ball 97 becomes resting on 99a of the recess 99. Next, when the first control wire connecting member 61 is turned vigorously in the clockwise direction, the second control wire connecting member 65 does not rotate, because the projection 85 is contacted with the side wall 77 and the first speed change rod 17 stays in the inside position, the ball 75 is admitted to the blind hole 71 against the spring 71 and only the first control member 61 rotates further in the clockwise direction. Accordingly, the connecting piece 115 is brought to rotation in the clockwise direction keeping its contacting condition with the side wall 117 of the clearance 117 to cause traction of the first control wire 113. This results in rotation of the link 37′ and a thrust of the second speed change rod 17′ to the inside position. In this case, the highest speed is obtained with the first speed change rod 17 and the second speed change rod 17′ located both in the inside position.

Contrary to the above description, from the intermediate speed represented in FIG. 8 through FIG. 11, when the connecting piece 115, as shown in FIG. 9, rotates in the counterclockwise direction until it strike against the side wall 117b of the arc shaped clearance 117, the connecting piece 115 slips inside the clearance 117 without producing traction of the first control wire 113 and the second speed change rod 17′ keeps its position in the outside.

As the second control wire connecting member 65 rotates, by way of the spring 71 and ball 75, in the counterclockwise direction integrally with the first control wire connecting member 61, the second control wire 133 becomes to receive a thrust and the first speed change rod 17, by the action of the spring 23 as shown in FIG. 5, is displaced to the outside position. Accordingly, the low speed becomes available, as the first speed change rod 17 is located in the outside position and the second speed change rod located outside. Further, at this moment, the projection 85 on the second control wire connecting member 65 is brought to contact with the side wall 79 of the recess 83 and the ball 97 is brought to engagement with 99b inside the recess 99.

Next, when the first control wire connecting member 61 is rotated in the counter-clockwise direction through a large angle the second control wire connecting member remains unrotated to keep the first speed change rod 17 in the outside position, letting only the first control member 61 rotate. Accordingly, as the connecting piece 115 rotates in the counter-clockwise direction by the side wall 117b of the clearance 117 to pull the first control wire 113 and to rotate the link 37', the second speed change rod 17' becomes displaced to the inside position. Accordingly, the lowest speed is produced, with the first speed change rod 17 located in the outside position and the second speed change rod 17' in the inside position.

For obtaining the intermediate speed, only thing to do is place the first speed change rod 17 to the intermediate position located between the inside and outside position and that of the second speed change rod 17' stays unaffected and as, for the highest or lowest speed the first rod 17 passes through the intermediate position, the intermediate speed can be obtained by keeping the grip 57 in the position prior to rotation without rotating the first control wire connecting member 61.

FIG. 13 represents a version of position in which the ratchet 19r is installed in a principle view of FIG. 4. Namely, in FIG. 4, the ratchet 19r is located between the sleeve 19 and the first ring gear 9, however, in FIG. 13 it is located between the input component member 13 and the first ring gear 9 and the rest of the construction stands in the same way as described in FIG. 4.

Further, FIG. 13(A) through (E) represents the highest, high, intermediate, low and lowest condition in principle respectively. In FIG. 14, in the speed change mechanism represented in principle in FIG. 4, the second sun gear 3's is installed integrally in the hub axle 1, the first sun 3s is separated from the second carrier 7' of the second planetary gear 5' and installed free to slide axially relative to the hub axle 1 and a dog clutch is installed detachably between the second carrier 7' and the first sun gear 3s and also a dog clutch is installed between the first sun gear 3s is made to slide axially by the second speed change rod 17' and the rest of the construction stands in the same way as described in FIG. 4 in principle.

And, FIG. 14(A) through (E) represents the highest, high, intermediate, low and lowest speed condition respectively.

FIG. 15 represents a changed location of the ratchet 19 as shown in principle in FIG. 14 according to the way as represented in FIG. 13 and the rest of the construction stands in the same way as described in FIG. 14.

Further, FIG. 15(A) through (E) represents the highest, high, intermediate, low and the lowest speed condition respectively.

I claim:

1. An internally accommodated speed change mechanism for a bicycle or the like, comprising:
   a hub axle,
   a hub body freely rotatable on said hub axle;
   first and second sun gears each of which is mounted in axially fixed position on said hub axle and each of which is selectably rotatable relative to said hub axle;
   a first planetary gear meshing with said first sun gear;
   a second planetary gear meshing with said second sun gear;
   a first ring gear meshing with said first planetary gear;
   a second ring gear meshing with said second planetary gear;
   a first carrier supporting said first planetary gear for free rotation and being integral with said second ring gear
   a second carrier supporting said second planetary gear for free rotation and being integral with said first sun gear
   a drive sprocket rotatably mounted relative to said hub axle;
   an input member mounted on said hub axle, to be rotatably driven by said driving sprocket;
   a first speed change rod supported for axial movement relative to said hub axle and being selectably axially movable from a first position inwardly to a second or third axial position;
   a second speed change rod supported for axial movement relative to said hub axle and being selectably axially movable to either a first or second axial position;
   means associated with said second speed change rod to fix said first sun gear to said hub axle and to release said second sun gear for rotation about said hub axle when said second speed change rod is in said first position, and to fix said second sun gear to said hub axle and to release said first sun gear for rotation about said hub axle when said speed change rod is in said second position;
   a sleeve axially movable on said hub axle in response to said axial movement of said first speed change rod and rotatably driven by said input member;
   a first ratchet rotatably driven by said input member and operative to rotate said first ring gear;
   a second ratchet mounted on said first ring gear in position to drivingly engage said hub body when said first speed change rod is in either said second or third axial position, and to be disengaged from said hub body in said first axial position;
   a third ratchet mounted on said second ring gear in position to engage said hub body; and
   a fourth ratchet carried by said sleeve and engagable to rotate said first carrier only when said first speed change rod is in said third position.

2. A speed change mechanism as in claim 1, wherein said means associated with said second speed change rod comprises first and second dog clutches respectively associated with said first and second sun gears, and means carried by said second speed change rod to selectively engage either one or the other of said dog clutches in response to axial movement of said second speed change rod.

3. The speed change mechanism as in claim 1, wherein said first ratchet is in constant engagement with said first ring gear.

4. The speed change mechanism as in claim 3, in which said first ratchet is carried by said sleeve.

5. The speed change mechanism as in claim 3, in which said first ratchet is carried by said input member.

* * * * *